(12) United States Patent
Haugom et al.

(10) Patent No.: US 11,794,864 B2
(45) Date of Patent: Oct. 24, 2023

(54) GYRO STABILIZER

(71) Applicant: SLEIPNER MOTOR AS, Fredrikstad (NO)

(72) Inventors: Frode Haugom, Oslo (NO); Kjetil Huseklepp, Fredrikstad (NO); Ronny Skauen, Fredrikstad (NO)

(73) Assignee: SLEIPNER MOTOR AS, Fredrikstad (NO)

( * ) Notice: Subject to any disclaimer, the term of this patent is extended or adjusted under 35 U.S.C. 154(b) by 0 days.

(21) Appl. No.: 17/770,409

(22) PCT Filed: Oct. 19, 2020

(86) PCT No.: PCT/NO2020/050257
§ 371 (c)(1),
(2) Date: Apr. 20, 2022

(87) PCT Pub. No.: WO2021/080437
PCT Pub. Date: Apr. 29, 2021

(65) Prior Publication Data
US 2022/0388611 A1 Dec. 8, 2022

(30) Foreign Application Priority Data

Oct. 21, 2019 (NO) .................................. 20191256

(51) Int. Cl.
*B63B 39/04* (2006.01)
(52) U.S. Cl.
CPC .................................. *B63B 39/04* (2013.01)
(58) Field of Classification Search
CPC ......... B63B 39/00; B63B 39/04; G01C 19/02; G01C 19/24; G01C 19/30; G01C 21/18; H02K 1/12; H02K 1/22; H02K 9/22; F16C 32/0408; Y10T 74/125
USPC .................................................. 114/121, 122
See application file for complete search history.

(56) References Cited

U.S. PATENT DOCUMENTS

| 2,202,162 | A | * | 5/1940 | Minorsky ............... B63B 39/06 |
| | | | | 114/122 |
| 3,787,100 | A | | 1/1974 | Habermann et al. |
| 3,845,995 | A | | 11/1974 | Wehde |
| 3,888,553 | A | | 6/1975 | Wehde |

(Continued)

FOREIGN PATENT DOCUMENTS

| CN | 102381452 A | 3/2012 |
| DE | 33 10 110 A1 | 9/1984 |

(Continued)

OTHER PUBLICATIONS

International Preliminary Report on Patentability, issued in PCT/NO2020/050257, dated Sep. 23, 2021.

(Continued)

*Primary Examiner* — Daniel V Venne
(74) *Attorney, Agent, or Firm* — Birch, Stewart, Kolasch & Birch, LLP

(57) ABSTRACT

A gyro stabilizer includes a rotor arranged to rotate about a spin axis, and a stator, wherein the rotor and the stator include rotor and stator assemblies, respectively. The rotor assembly is arranged radially outside the stator assembly with respect to the spin axis, wherein the rotor and/or stator assemblies include magnets with magnetic axis in the direction of the spin axis.

21 Claims, 5 Drawing Sheets

(56) References Cited

U.S. PATENT DOCUMENTS

| | | | | |
|---|---|---|---|---|
| 7,240,630 B2* | 7/2007 | Akers | ..................... | B63B 39/04 |
| | | | | 114/122 |
| 7,458,329 B2* | 12/2008 | Nedwed | .................. | B63B 39/04 |
| | | | | 114/122 |
| 9,452,810 B2* | 9/2016 | Nohara | ................... | B63B 39/04 |
| 2005/0076726 A1 | 4/2005 | Akers | | |
| 2005/0274210 A1 | 12/2005 | Adams et al. | | |

FOREIGN PATENT DOCUMENTS

| | | |
|---|---|---|
| EP | 3 098 157 A1 | 11/2016 |
| WO | WO2007/095403 A2 | 8/2007 |

OTHER PUBLICATIONS

International Search Report, issued in PCT/NO2020/050257, dated Feb. 5, 2021.
Written Opinion of the International Searching Authority, issued in PCT/NO2020/050257, dated Feb. 5, 2021.

* cited by examiner

GYRO STABILIZER

TECHNICAL FIELD

The present invention relates to technology for stabilizing boats and ships. More specifically, the invention relates to a gyroscopic stabilizer with magnetic bearing that can be used to counteract roll motion.

BACKGROUND

Prior art gyro stabilizers for vessels work according to the well-established principle of stabilizing roll motion of the boat or vessel by making use of counteracting torque from a gyro stabilizer with a flywheel, or rotor, spinning in a gimbal structure.

When the gyro stabilizer is arranged in the vessel or boat, it is oriented with orthogonal flywheel spin axis, gimbal axis and vessel roll axis, where the vessel roll axis is in the longitudinal direction of the vessel. The angular momentum of the spinning flywheel is a conserved physical quantity, and when the boat rolls, the flywheel will precess to maintain angular momentum. The precession will create a stabilizing torque counteracting the rolling torque on the hull, such that the gyro stabilizer will tend to right the boat.

During precession, i.e. when the gyro is precessing to counteract roll, the flywheel angle will vary with respect to the hull, resulting in torque components in the yaw and/or pitch directions. However, the vessel is in general resistant to both pitch and yaw rotation, but roll stabilizing efficiency is reduced with increased flywheel angle.

An example of such a gyroscopic roll stabilizer is presented in US20050076726A1 and US2005274210 A1. The stabilizer includes a flywheel or a rotor, a flywheel drive motor configured to spin the flywheel about a spin axis, a gimbal structure configured to permit flywheel precession about a gimbal axis, and a device for applying a torque to the flywheel about the gimbal axis. The flywheel and gimbal structure are configured so that when installed in the boat the stabilizer damps roll motion of the boat. An electric motor connected to a spin axle accelerates the rotor up to a desired rotational speed. The flywheel may be mounted in an evacuated chamber to reduce air drag. The first reference indicates that the rotor may spin at a rate of 10000 rpm or higher.

However, as acknowledged in WO2007095403 A2, the heavy flywheel operating at high rotational speed is supported by bearings that are subjected to high axial and radial loads. As a result, these bearings produce a substantial amount of friction-generated heat, which must be dissipated in order to avoid dangerous heat build-up.

CN 102381452A shows a gyro stabilizer for a boat where a mechanical gear is used when spinning the rotor up to high speed, in order to reduce the size of the stabilizer.

As a result, high rotational speed is related to high abrasion of bearings and reduced lifetime. It is therefore difficult to increase rotational speed further, and gyros must be made large to keep rotational speed low and at the same time achieve sufficiently large gyroscopic precession.

U.S. Pat. No. 3,888,553 discloses a levitating magnetic device, where a rotor is magnetically supported. However, this type of solution is not well adapted to handle large torque as a result of roll movements in a boat, and to provide an opposite directed torque to stabilize the boat.

SHORT SUMMARY

A goal with the present invention is to overcome the problems of prior art, and to disclose an improved gyrostabilizer and a gyrostabilizer system.

To achieve the desired stabilizing effect with a more compact gyrostabilizer, the flywheel should preferably have a large part of its mass located along its circumference, or rim. If rotational speed can be increased, the weight and size of the flywheel can be reduced, but with present technology this is difficult due to e.g. the load and wear of the bearings.

The invention solving the above-mentioned problems is a gyro stabilizer according to the independent claims.

The following technical effects may be obtained by the gyro stabilizer according to embodiments of the invention;

The gyro stabilizer may be made more compact than prior art stabilizers, since the rotational speed of the rotor can increase without increasing abrasion and reducing lifetime of ball bearings.

Since the gyro stabilizer can rotate with higher rotational speed, the rotor diameter may be reduced, and less torque is required to start spinning the rotor.

The gyro stabilizer may have a higher reliability and energy efficiency than prior art gyro stabilizers.

Consequently, there may be a reduced cost of operation.

The gyro stabilizer is oil free and therefore cleaner and more environmentally friendly than gyro stabilizers with an oil sump.

The gyro stabilizer can withstand high transient loads, which are common in stabilizer systems.

Due to its design it may be easily sealed to operate in vacuum or gas filled space.

EMBODIMENTS OF THE INVENTION

Figure 1:
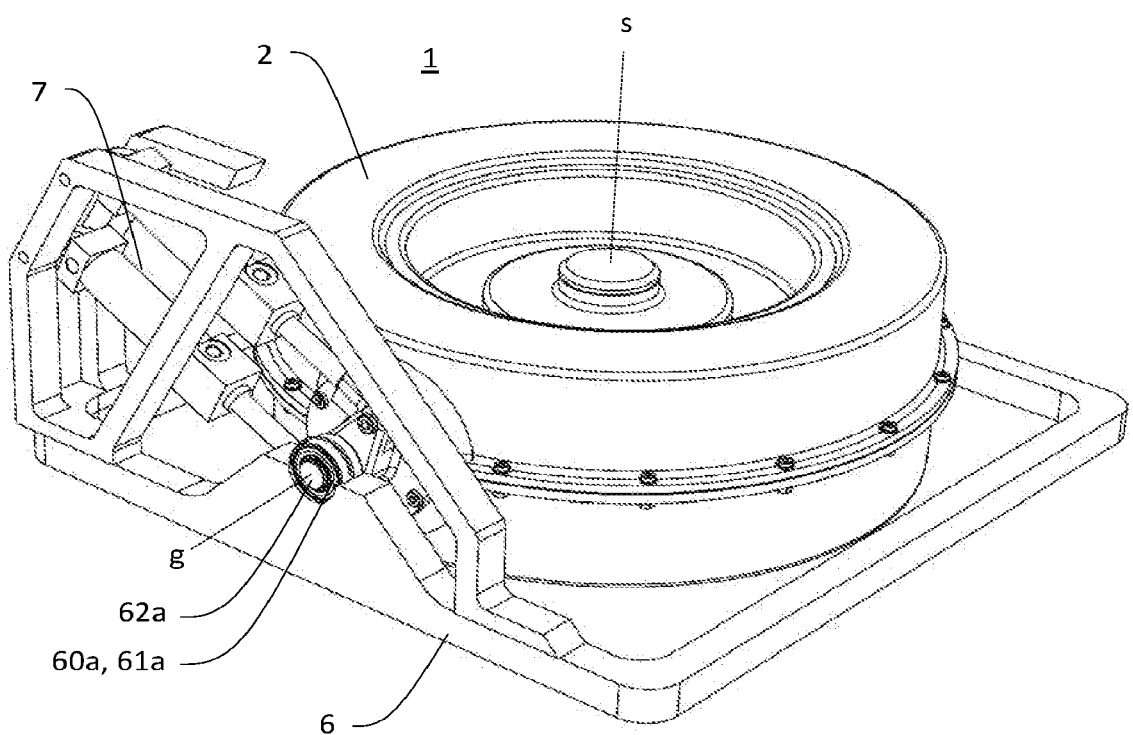
FIG. 1 illustrates in a perspective view an embodiment of a gyro stabilizer 1 according to the invention.

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent or related embodiments defined in relation to the numbered embodiments are described. Unless otherwise specified, any embodiment that can be combined with one or more numbered embodiments may also be combined directly with any of the dependent embodiments of the numbered embodiments referred to.

In a first embodiment the invention is a gyro stabilizer 1 comprising a rotor 3 arranged to rotate about a spin axis s and a stator 2, wherein the rotor 3 and the stator 2 comprise rotor and stator assemblies 31, 21, respectively. The rotor assembly 31 is arranged radially outside the stator assembly 21 with respect to the spin axis s as illustrated e.g. in FIG. 2, and the rotor and/or stator assemblies 31, 21 comprises magnetic field producing elements 31a, 21a e.g. magnets, wherein the rotor and/or stator assemblies 31, 21 comprises rotor and/or stator magnets 31a, 21a respectively.

In a first dependent embodiment, the rotor and/or stator magnets 31a, 21a have magnetic axis in the direction of the spin axis.

The magnetic axis is the line joining the two poles of a magnet.

In a second dependent embodiment, that may be combined with the first dependent embodiment, the rotor/and or stator assembly magnets 31a, 21a are stacked with alternating magnetic field directions in the direction of the spin axis s.

In a third dependent embodiment, that may be combined with the first or second dependent embodiment, the rotor and/or stator assemblies 31, 21 comprises rotor and/or stator intermediate elements 31b, 21b, arranged between the rotor and/or stator magnets 31a, 21a respectively.

In a fourth dependent embodiment that may be combined with any of the dependent embodiments above, wherein both the rotor and stator assemblies 31, 21 comprises magnets, wherein magnets in the stator assembly 21 are vertically aligned with—and interfaces magnets in the rotor assembly 31 with opposite magnetic field directions.

In a fifth dependent embodiment, that may be combined with the third and fourth dependent embodiments, both the rotor and stator assemblies 31, 21 comprise intermediate elements 31b, 21b, the rotor intermediate elements 31b are vertically aligned with and interfaces corresponding stator intermediate elements 21b.

In a sixth dependent embodiment, that may be combined with any of the third to fifth dependent embodiments, the rotor intermediate elements 31b are arranged closer to the stator assembly 21 than rotor magnets 31a.

In a seventh dependent embodiment, that may be combined with any of the third to sixth dependent embodiments, stator intermediate elements 21b are arranged closer to the rotor assembly 31 than stator magnets 11a.

In an eight dependent embodiment, that may be combined with any of the third to seventh dependent embodiments, any of the rotor and/or stator intermediate elements 31b, 21b are made in ferromagnetic material.

The stator and/or rotor assembly 31 may be ring shaped.

In a second embodiment that may be combined with the first embodiment, the stator and rotor assemblies 21, 31 interfaces each other and are configured to provide layered radial magnetic field lines with alternating directions in a direction perpendicular to the radial direction.

In a first related embodiment, the rotor assembly 31 comprises a layered structure of rotor magnetic field producing elements 31a separated by rotor intermediate elements 31b in the direction perpendicular to the radial direction.

In a second related embodiment that may be combined with the first related embodiment, subsequent rotor magnetic field producing elements 31a have alternating magnetic field directions perpendicular to the radial direction.

In a third related embodiment that may be combined with the first or second related embodiment, the stator assembly 21 comprises a layered structure of stator magnetic field producing elements 21a separated by stator intermediate elements 21b in the direction perpendicular to the radial direction, wherein subsequent stator magnetic field producing elements 21a have alternating magnetic field directions perpendicular to the radial direction, and interfacing stator magnetic field producing elements 21a and rotor magnetic field producing elements 21a, both have magnetic fields perpendicular to the radial direction, but in opposite directions.

The rotor magnetic field producing elements 31a may be permanent magnets.

The rotor intermediate elements 31b may be made of steel.

Simulations have been performed, showing that the technical effect of magnetic support can be achieved with magnets only in the rotor assembly, only in the stator assembly or in both assemblies. The effect is considerably larger when there are magnets in both assemblies.

In a third embodiment the gyro stabilizer 1 comprises a rotor axle 36, 136 and a rotor frame 34, 134, wherein the rotor frame 34, 134 interconnects and rotationally fixes the rotor assembly 31 to the rotor axle 36, 136.

Figure 2:
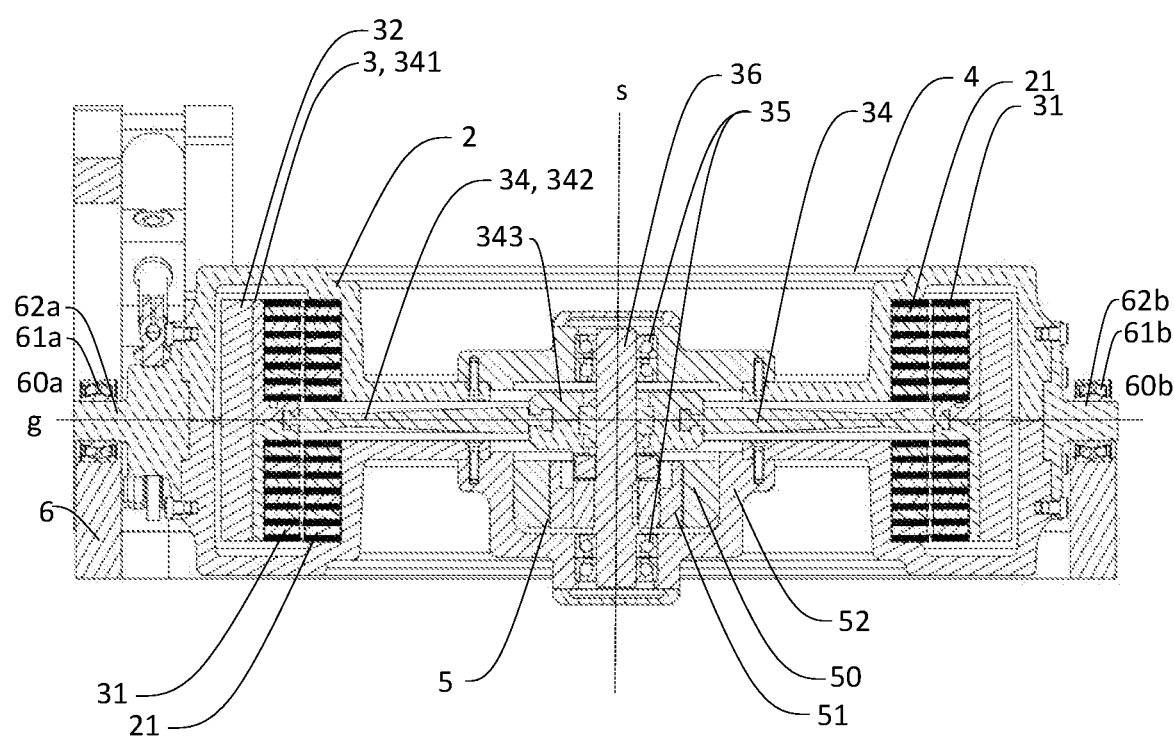
FIG. 2 illustrates in a section view the same embodiment of the gyro stabilizer 1 as in FIG. 1, where the cutting plane corresponds to the plane constituted by the spin and gimbal axis s, g.
Figure 5A:
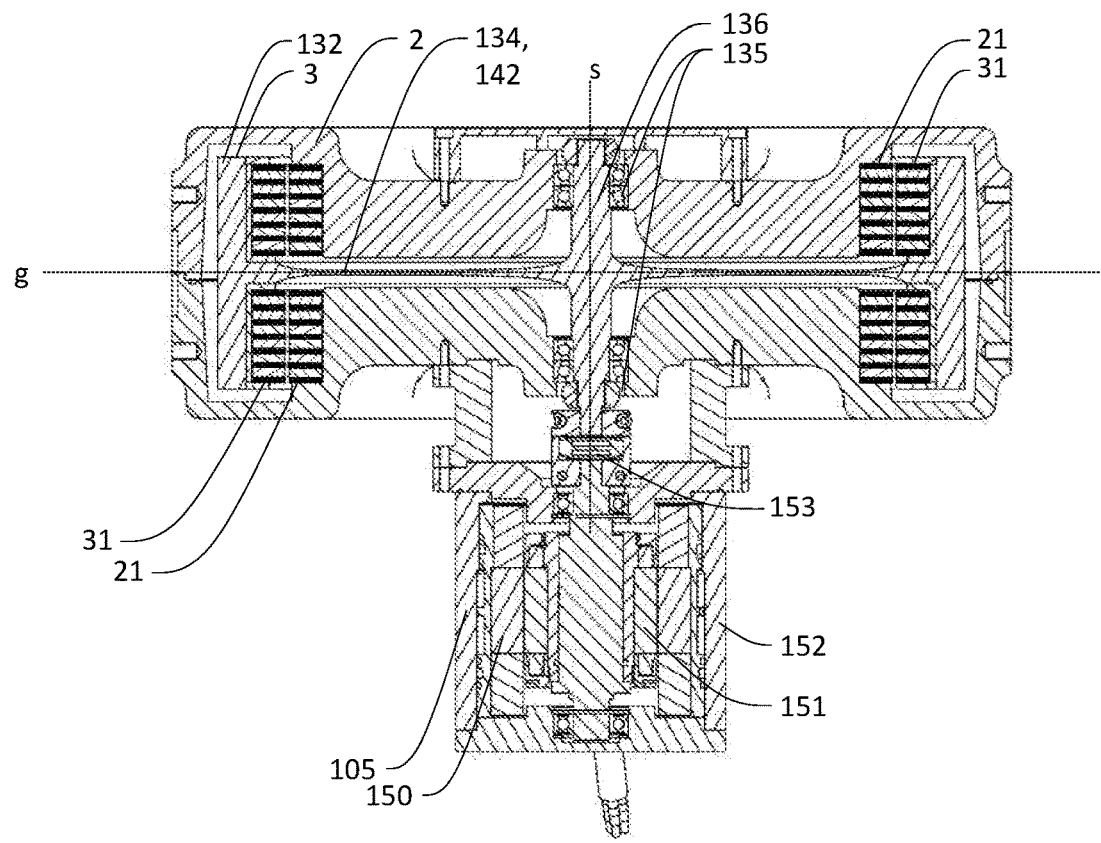
FIG. 5a illustrates in a section view an embodiment of the gyro stabilizer.

The rotor axle 36, 136 is in a first dependent embodiment supported by a rotational bearing 35, 135 fixed in the centre of the stator element 2 interconnecting the rotor axle 36, 136 and the stator element 2, and allowing the rotor element 3 to spin about the spin axis s. The rotational bearing 35, 135 may be split in an upper and a lower part to stabilize each end of the rotor axle 36, 136, as illustrated in FIG. 2 and FIG. 5a.

In second dependent embodiment, the rotor frame 134 is in a section symmetric about the rotor axle 36, 136.

In a third dependent embodiment, that may be combined with the first or second embodiments above, the rotor frame 134 is in a section symmetric about a plane perpendicular to the rotor axle 36, 136.

In a fourth embodiment, that may be combined with any of the embodiments above, the rotor frame 34 comprises a tubular ring 341 arranged outside the rotor assembly 31 and a radial element 342, wherein the radial element 342 is connected to the tubular ring 341 and the rotational bearing 35.

In a first related embodiment, that may be combined with the third related embodiment, the radial element 342 is connected to the tubular ring 341 in line with the gimbal axis g.

In a second related embodiment, that may be combined with the first related embodiment, the stator and rotor assemblies 21, 31 are split in upper and a lower parts arranged symmetrically on opposite sides of the gimbal axis g.

The rotor frame 34 is in a third related embodiment, that may be combined with the first or second related embodiment, at least partly made in a non-magnetic material or a material with low relative permeability, such as e.g. brass.

The radial element 342 may be disk shaped.

In a fourth related embodiment that may be combined with any of the first to third related embodiments above, the rotor 3 comprises a tubular support element 32 arranged radially outside the rotor assembly 31, wherein the tubular support element 32 is configured to support the rotor assembly 31 in the radial direction.

The tubular support element 32 may be made in a composite material such as e.g. carbon fibre.

In a fifth embodiment that may be combined with any of the third or fourth embodiments and their related embodiments the gyro stabilizer 1 comprises a flexible coupling element 343 between the rotor axle 36 and the rotor frame 34, configured to allow the rotor magnetic assembly 31 to pivot with regard to the rotor axle 36 and the stator assembly 21.

In a first related embodiment the flexible coupling element 343 is configured to allow the rotor magnetic assembly 31 to pivot with regard to the rotor axle 36 and the stator assembly 21 with an angle of at least 0.2 degree.

In a second related embodiment that may be combined with the first related embodiment the flexible coupling element 343 is a flexible jaw coupling where one end is connected to the rotor axle 36 and the other to the rotor frame 34.

In a sixth embodiment, that may be combined with any of the first or second embodiments above, the gyro stabilizer 1 comprises a one piece rotor frame 134, wherein the rotor frame 134 comprising a rotor axle portion 136, a radial support portion 132, and a disc portion 142 interconnecting the rotor axle portion 136 and the radial support portion 132.

The rotor axle portion 136 is in a first related embodiment supported by a rotational bearing 135 fixed in the centre of the stator element 2 interconnecting the rotor axle 136 and the stator element 2, and allowing the rotor element 3 to spin about the spin axis s. The rotational bearing 135 may be split in an upper and a lower part to stabilize each end of the rotor axle 136, as illustrated in FIG. 5a. The bearing 136 supports the rotor axle and the rotor portion in the radial direction.

In a second related embodiment, that may be combined with the first related embodiment, the one-piece rotor frame 134 is made in a high strength material, such as e.g. steel. Moulding or forging are examples of manufacturing techniques that could be used.

Inside the stator element 2 there is a stator assembly 21 and a rotor assembly 31, where the rotor assembly 31 is arranged radially outside the stator assembly 21.

In a third dependent embodiment the radial support portion 132 extends from the periphery of the disc portion 142 in a direction perpendicularly to the disc portion to form a cylinder.

In a fourth dependent embodiment, dependent on the third dependent embodiment, the rotor assembly 31 is arranged fixed to the inner walls of the cylinder.

In a fifth dependent embodiment the rotor 3 comprises a spacer ring 137 arranged between the rotor assembly 31 and the cylinder. The spacer ring may be made in a non-magnetic or a material with low relative permeability, e.g. stainless steel 304 to reduce magnetic flux in the radial support portion 132 of the rotor 3.

In a sixth embodiment that may be combined with any of the first to fifth embodiments, the gyro stabilizer comprises a frame 6 configured to be fixed to a boat, wherein the stator element 2 is configured to pivot about a gimbal axis g with respect to the frame 6, wherein the gimbal axis g is perpendicular to the spin axis g.

In a first related embodiment the gyro stabilizer comprises first and second gimbal pivots 60a, 60b pivotally interconnecting the stator element 2 and the frame 6, wherein the first and second gimbal pivots 60a, 60b, in a plane perpendicular to the spin axis s, are arranged outside the rotor element 3 and the stator element 2.

In a second related embodiment that may be combined with the first related embodiment, the frame 6 comprises gimbal bearings 61a, 61b configured to support gimbal shafts 62a, 62b extending radially outwards from an outer radius of the stator element 2, wherein the gimbal shafts 62a, 62b are fixed to the stator element 2.

The gyro stabilizer 1 comprises in a seventh embodiment, that may be combined with any of the embodiments above, a spin motor 5, 105 configured to rotate the rotor element 3 relative the stator element 2. The spin motor 5, 105 comprises a motor stator member 50, 150 rotationally fixed to the stator element 2 and a motor rotor member 51, 151 rotationally fixed to rotor element 3. The spin motor 5, 105 may comprise a motor housing 52, 152 enclosing the spin motor 5, 105 and configured to transfer heat from the spin motor 5, 105 to the surroundings, The rotor member 51, 151 may dissipate heat to the rotor 3.

The gyro stabilizer 1 comprises in a first dependent embodiment a brake 7 interconnecting the frame 6 and the stator element 2.

The brake 7 may be an active brake 7 comprising an actuator.

The gyro stabilizer may in an embodiment comprise a housing 4 enclosing the stator and rotor magnetic assemblies 21, 31 in a gas filled or evacuated space. The spin motor 5, 105 may also be arranged inside the same housing.

An independent embodiment will now be explained with reference to the attached drawings.

FIG. 1 illustrates in a perspective view an embodiment of a gyro stabilizer 1 according to the invention. The stator element 2 is supported by the frame 6, and the rotor element not visible is configured to rotate about the spin axis s inside the stator element 2, and the stator element 2 may pivot about the gimbal axis g to set up a stabilizing torque in the opposite direction of a motion of the frame in the plane constituted by the gimbal and spin axis g, s. In addition, FIG. 1 shows a gimbal pivot 60a interconnection one side of the stator element 2 and the frame 6. The gimbal pivot 60a comprises gimbal bearings 61a arranged in the frame 6, and gimbal shaft 62a extending radially outwards from an outer radius of the stator element 2, wherein the gimbal shaft 62a is fixed to the stator element 2 and supported by the gimbal bearing 61a. A clamp around the upper part of the gimbal pivot 60a and removably fixed to frame 6 the has been intentionally left out for illustration purposes. The gyro stabilizer 1 has a respective gimbal pivot on the opposite side of the stator element 2 which is not visible in the drawing. The gyro stabilizer 1 also comprises a brake 7 between the stator element 2 and the frame 6.

FIG. 2 illustrates in a section view the same gyro stabilizer 1 as in FIG. 1, where the cutting plane corresponds to the plane constituted by the spin and gimbal axis s, g. As can be seen, the stator element 2 provides a housing for the rotor element 3. In the centre of the stator element 2 there is a rotational bearing 35, interconnecting the rotor axle 36 and the stator element 2, and allowing the rotor element 3 to spin about the spin axis s. In this embodiment the rotational bearing 35 is split in an upper and a lower part to stabilize each end of the rotor axle 36.

Inside the stator element 2 there is a stator assembly 21 and a rotor assembly 31, where the rotor assembly 31 is arranged radially outside the stator assembly 21. Further details about the assemblies can be seen in FIG. 3.

The rotor element 3 comprises a rotor frame 34 comprising a tubular support element 32 arranged radially outside the rotor assembly 31 configured to support the rotor assembly 31 in the radial direction. In this embodiment the support element 32 is made in carbon fibre material.

The rotor frame 34 further comprises a tubular ring 341 arranged radially between the rotor assembly 31 and the tubular support element 32, and a radial element 342 implemented as a disk interconnecting the tubular ring 341 and the rotor axle 36. Between the rotor axle 36 and the disk 342 there is provided a flexible coupling element 343, allowing the rotor magnetic assembly 31 to pivot slightly with regard to the rotor axle 36 and the stator assembly 21. The flexible coupling element 343 is here a flexible jaw coupling where one end is connected to the rotor axle 36 and the other to the disk 342.

The tubular ring 341 is made in brass and the radial element 342 is made in aluminium.

The gyro stabilizer comprises a frame 6 configured to be fixed to a boat, wherein the stator element 2 is configured to pivot about a gimbal axis g with respect to the frame 6, wherein the gimbal axis g is perpendicular to the spin axis g.

Further the gyro stabilizer comprises first and second gimbal pivots 60a, 60b pivotally interconnecting the stator element 2 and the frame 6 The first and second gimbal pivots 60a, 60b are arranged, in a plane perpendicular to the spin axis s outside the rotor element 3 and the stator element 2.

The frame 6 comprises gimbal bearings 61a, 61b configured to support gimbal shafts 62a, 62b extending radially outwards from an outer radius of the stator element 2, wherein the gimbal shafts 62a, 62b are fixed to the stator element 2.

A spin motor 5 is located below the radial element 342 and configured to spin the rotor element 3 about the spin axis s. The spin motor 5 comprises a motor rotor element 51 fixed to the rotor axle 36 and a motor stator element 50 fixed to the stator element 2. A motor housing 52 encloses the spin motor 5 and transfers heat from the motor to the surroundings.

It should be noted that the centrifugal force from the rotating rotor assembly 31 is primarily taken up by the support element 32 and not the radial element 342. The purpose of the radial element 342 is mainly to transfer rotational energy from the spin motor 50 to the rotor assembly 31, and radial positioning of the rotor 3.

Figure 3A:
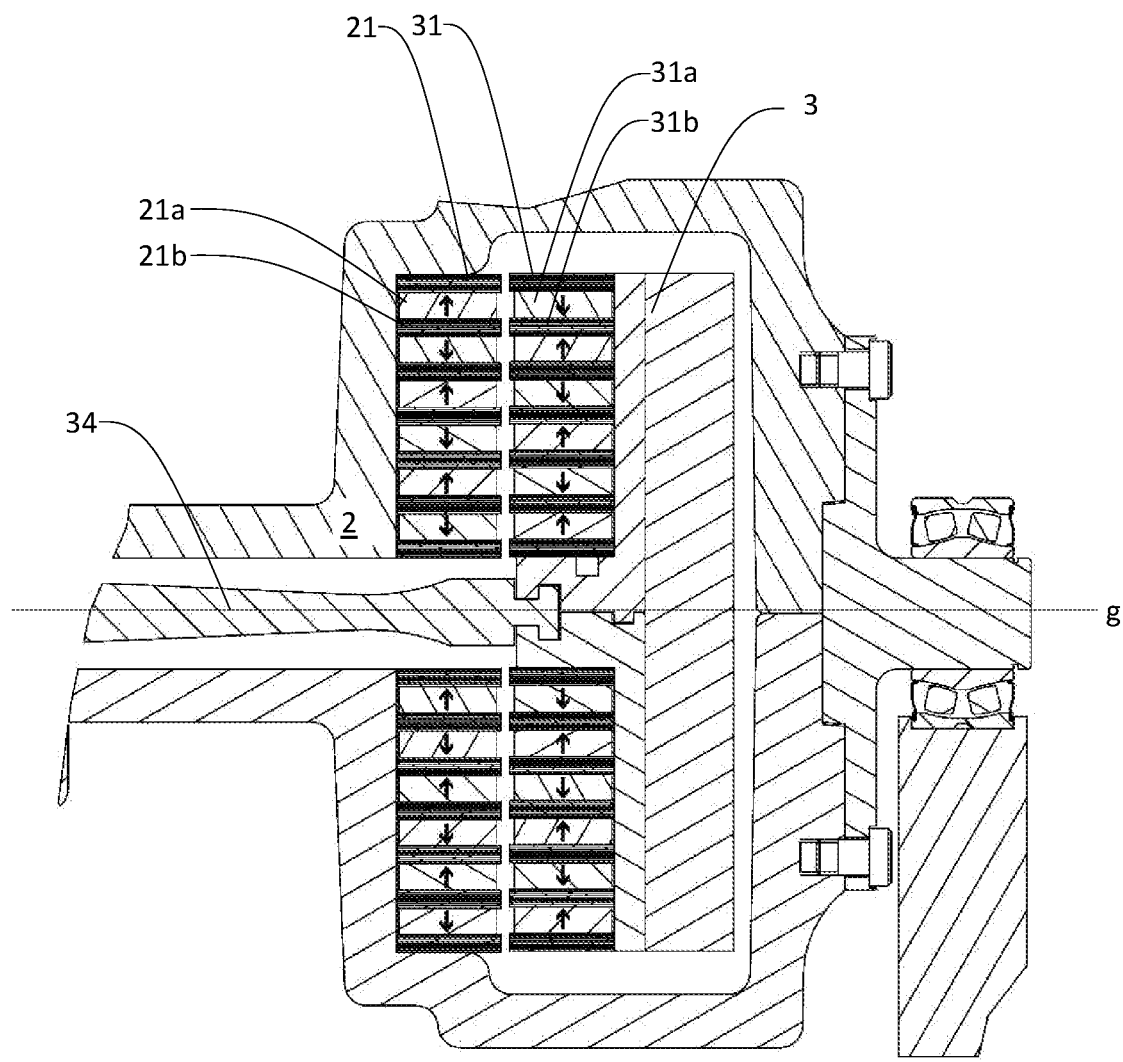
FIG. 3a illustrates the stator assembly 21 and the rotor assembly 31 in FIG. 2 in more detail in a section view.

FIG. 3a illustrates the stator assembly 21 and the rotor assembly 31 in FIG. 2 in more detail in a section view. The stator assembly 21 comprises a layered structure of stator magnetic field producing elements 21a and stator intermediate elements 21b, where the stator magnetic field producing elements 21a are permanent magnets and the stator intermediate elements 21b are made of steel.

The rotor assembly 31 comprises correspondingly a layered structure of rotor magnetic field producing elements 31a and rotor intermediate elements 31b in the same materials.

As can be seen from the drawings, the stator intermediate elements 21b are in line with the rotor intermediate elements 31b and the stator magnetic field producing elements 21a are in line with the rotor magnetic field producing elements 31a.

In the drawings the direction of the magnetic fields of the stator and rotor magnetic field producing elements 21a, 31a have been illustrated as arrows from south to north pole. More specifically, subsequent stator magnetic field producing elements 21a have alternating directions perpendicular to the radial direction. The same is true for the rotor magnetic field producing elements 31a. In addition, stator magnetic field producing elements 21a and rotor magnetic field producing elements 21a at the same level, i.e. interfacing magnetic elements, have opposite magnetic fields.

Figure 3B:
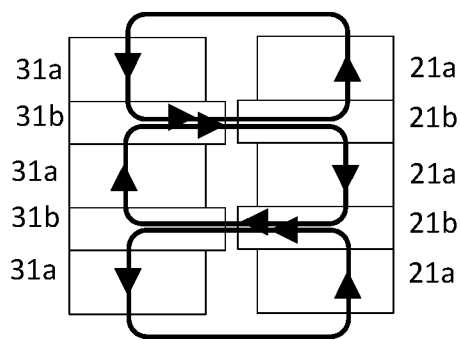
FIG. 3b illustrates schematically magnetic field lines resulting from the configuration of the stator and rotor assemblies 21, 31.

FIG. 3b illustrates schematically magnetic field lines resulting from the configuration of the stator and rotor assemblies 21, 31. As seen the stator and rotor magnetic field producing elements 21a, 31a above and below the intermediate elements 21b, 31b all contribute to the magnetic fields in the intermediate elements 21b, 31b in the radial direction.

As can be seen, the direction of the magnetic field lines in the radial direction alternates for subsequent levels of intermediate elements 21b, 31b. In this section, as well as in other sections around the circumference of the interface between the stator and rotor assemblies 21, 31, similar magnetic fields are set up, and the rotor element 3 is held steadily in balance in a centred position.

Figure 4A:
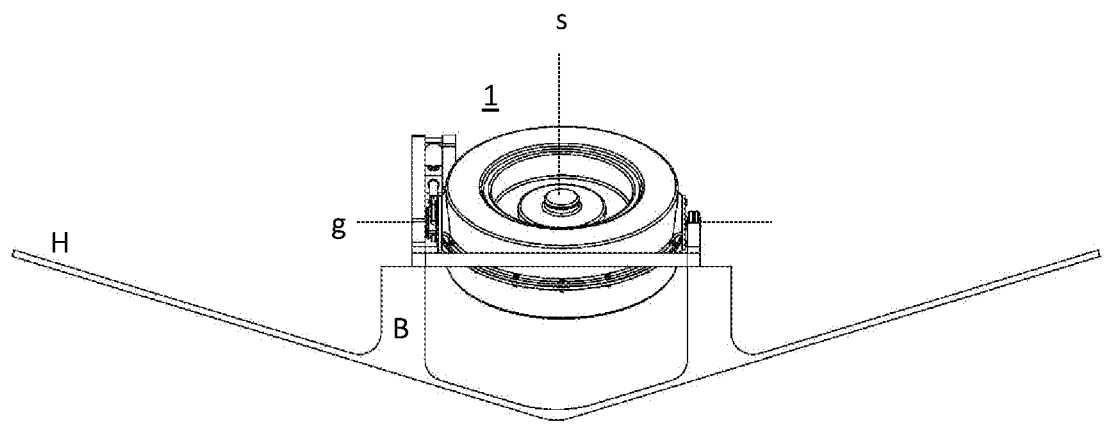
FIGS. 4a and 4b illustrate a section view of a hull H of a boat where the gyro stabilizer in FIG. 1 is arranged with the frame 6 resting on a bracket B or stringer in the centre of the hull.
Figure 4B:
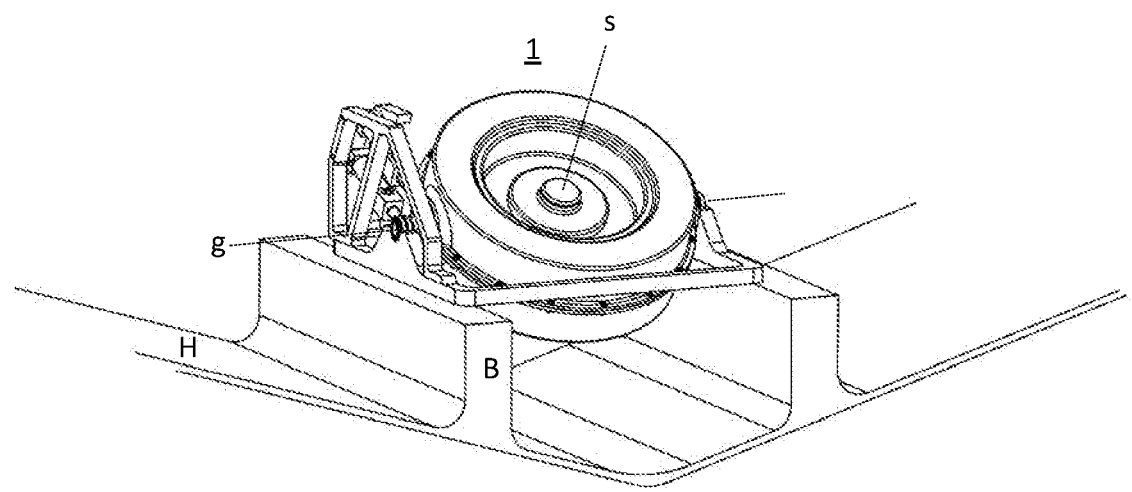
Figure 5B:
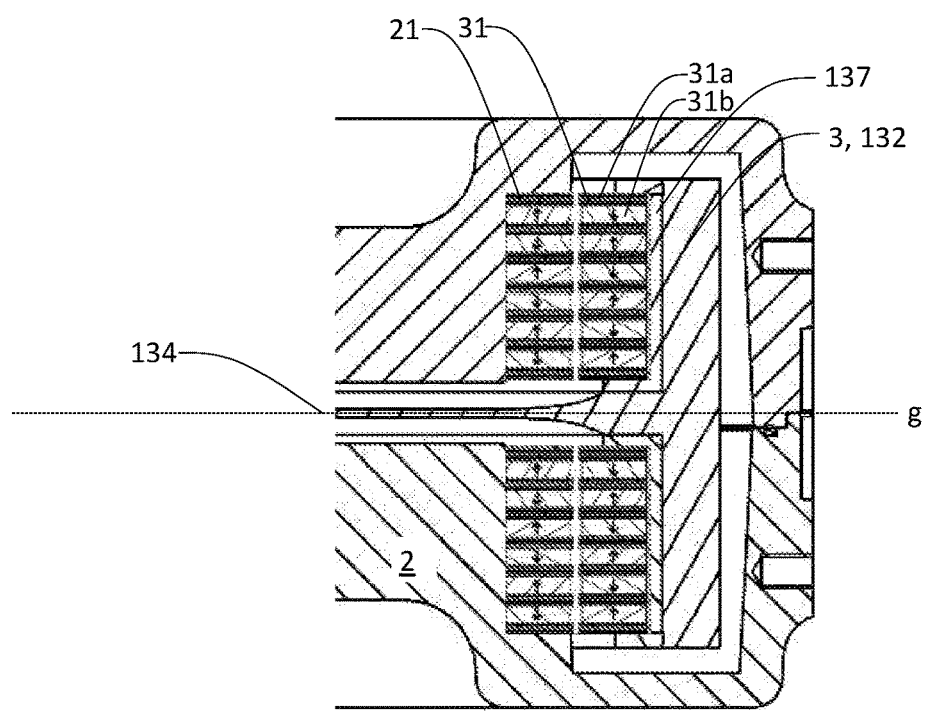
FIG. 5b illustrates the stator assembly 21 and the rotor assembly 31 in FIG. 5a in more detail in a section view.

In FIGS. 5a and 5b an alternative embodiment of the invention is shown in a section view. This embodiment may externally be similar to the embodiments shown in FIG. 1, FIG. 4a and FIG. 4b. However, internally the rotor frame and support for the rotor frame differs from the one illustrated in FIG. 2 and FIG. 3a.

As can be seen, the stator element 2 provides a housing for the rotor element 3. In the centre of the stator element 2 there is a rotational bearing 135, allowing the rotor element 3 to spin about the spin axis s. In this embodiment the rotational bearing 135 is split in an upper and a lower part.

Inside the stator element 2 there is a stator assembly 21 and a rotor assembly 31, where the rotor assembly 31 is arranged radially outside the stator assembly 21. Further details about the assemblies can be seen in FIG. 5b and FIG. 3b.

The rotor element 3 comprises a one-piece rotor frame 134. The one-piece rotor frame comprises the rotor axle portion 136, supported by the rotational bearing 135, a radial support portion 132, and a flexible disc portion 142 interconnecting the rotor axle portion 136 and the radial support portion 132. The radial support portion 32 extends from the periphery of the disc in a direction perpendicularly to the disc to form a cylinder, wherein the rotor assembly is arranged fixed to the inner walls of the cylinder. The cylinder is symmetric about the disc portion.

Precession will only take place if the rotor assembly 31 is displaced relative to the stator assembly 21. According to this embodiment, the one-piece rotor frame is flexible, allowing the radial support portion 132 to move perpendicularly relative to the rotor axle portion 136.

Thus, the stiffness of the disc portion 142 is sufficiently large to keep the rotor assembly 132 properly aligned with the stator assembly 121 whether the rotor is at standstill or spinning at full speed when no external torque is acting on the stator assembly, but sufficiently low to allow the rotor assembly to pivot slightly with regard to the stator assembly when the rotor is spinning and an external torque, such as a roll movement in a boat, is acting on the stator assembly.

Maximum relative displacement of the rotor assembly relative to the stator assembly may be constrained e.g. by the available physical space, or the delamination of the magnetic field lines.

The one-piece rotor frame is in this embodiment manufactured in forged steel.

In this embodiment a spin motor 105 is arranged with its motor axle connected to the rotor axle 136 rotor axle 136 via a flexible coupling 136. The spin motor 105 is located below the one-piece rotor frame 134 and configured to spin the rotor element 3 about the spin axis s. The spin motor 105 comprises a motor rotor element 151 fixed to the rotor axle 136 and a motor stator element 150 fixed to the stator element 2. A motor housing 152 encloses the spin motor 5 and transfers heat from the motor to the surroundings.

The spin motor in this embodiment may be replaced by other spin motors, e.g. where the motor axle is integrated with the rotor axle 136 and arranged inside a housing in the same way as in FIG. 2.

FIG. 5a does not specifically illustrate how the gyro stabilizer is mounted in a frame, but the gyro stabilizer comprises a frame configured to be fixed to a boat, wherein the stator element 2 is configured to pivot about the gimbal axis g with respect to the frame, and wherein the gimbal axis g is perpendicular to the spin axis g. The frame and related components could be similar to the frame 6 illustrated in FIG. 2. In this case the spin motor 105 could be arranged above the one-piece rotor frame 134 or integrated as in FIG. 2.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A gyro stabilizer comprising:
   a rotor arranged to rotate about a spin axis; and
   a stator,
   wherein the rotor and the stator comprise rotor and stator assemblies, respectively,
   wherein the rotor assembly is arranged radially outside the stator assembly with respect to the spin axis,
   wherein the rotor and/or stator assemblies comprises magnets with magnetic axis in a direction of the spin axis, and
   wherein the rotor and/or stator assembly magnets are stacked with alternating magnetic field directions in the direction of the spin axis.

2. The gyro stabilizer of claim 1, wherein, the rotor and/or stator assemblies comprises rotor and/or stator intermediate elements arranged between the rotor and/or stator magnets, respectively.

3. The gyro stabilizer of claim 1, wherein both the rotor and stator assemblies comprise magnets, wherein the magnets in the stator assembly are aligned with the magnets in the rotor assembly and interface the magnets in the rotor assembly with opposite magnetic field directions in the direction of the spin axis.

4. The gyro stabilizer of claim 2, wherein both the rotor and stator assemblies comprise intermediate elements, wherein the rotor intermediate elements are aligned with and interface corresponding stator intermediate elements in the direction of the spin axis.

5. The gyro stabilizer of claim 2, wherein the rotor intermediate elements are arranged closer to the stator assembly than the rotor magnets.

6. The gyro stabilizer of claim 2, wherein any of the rotor and/or stator intermediate elements are made of ferromagnetic material.

7. The gyro stabilizer of claim 1, wherein the stator and rotor assemblies interface each other and are configured to provide layered radial magnetic field lines with alternating directions in a direction perpendicular to the radial direction.

8. The gyro stabilizer of claim 7, wherein the rotor assembly comprises a layered structure of rotor magnetic field producing elements separated by rotor intermediate elements in a direction perpendicular to the radial direction.

9. The gyro stabilizer of claim 8, wherein subsequent rotor magnetic field producing elements have alternating magnetic field directions perpendicular to the radial direction.

10. The gyro stabilizer of claim 8, wherein the stator assembly comprises a layered structure of stator magnetic field producing elements separated by stator intermediate elements in a direction perpendicular to the radial direction, wherein subsequent stator magnetic field producing elements have alternating magnetic field directions perpendicular to the radial direction, and interfacing stator magnetic field producing elements and rotor magnetic field producing elements, both have magnetic fields perpendicular to the radial direction, but in opposite directions.

11. The gyro stabilizer of claim 8, wherein the rotor magnetic field producing elements are permanent magnets.

12. The gyro stabilizer of claim 8, wherein the rotor intermediate elements are made of steel.

13. The gyro stabilizer of claim 1, comprising a rotor axle and a rotor frame, wherein the rotor frame interconnects and rotationally fixes the rotor assembly to the rotor axle.

14. The gyro stabilizer of claim 1, wherein the rotor frame comprises a tubular support element made of carbon fibre, arranged radially outside the rotor assembly, wherein the tubular support element is configured to support the rotor assembly in the radial direction.

15. The gyro stabilizer of claim 13, comprising a flexible coupling element between the rotor axle and the rotor frame, configured to allow the rotor magnetic assembly to pivot with regard to the rotor axle and the stator assembly.

16. The gyro stabilizer of claim 13, comprising a one-piece rotor frame, wherein the rotor frame comprises a rotor axle portion, a radial support portion, and a disc portion interconnecting the rotor axle portion and the radial support portion.

17. The gyro stabilizer of claim 16, wherein the rotor axle portion is supported by a rotational bearing fixed in the centre of the stator element, interconnecting the rotor axle and the stator element, and allowing the rotor element to spin about the spin axis.

18. The gyro stabilizer of claim 16, wherein the one-piece rotor frame is made of molded or forged steel.

19. The gyro stabilizer of claim 16, wherein the radial support portion extends from a periphery of the disc portion in a direction perpendicular to the disc portion, to form a cylinder.

20. The gyro stabilizer of the claim 19, wherein the rotor assembly is arranged fixed to inner walls of the cylinder.

21. The gyro stabilizer of the claim 19, wherein the rotor comprises a spacer ring arranged between the rotor assembly and the cylinder.

* * * * *